United States Patent [19]
Mandeberg et al.

[11] Patent Number: 6,038,545
[45] Date of Patent: Mar. 14, 2000

[54] SYSTEMS, METHODS AND COMPUTER PROGRAM PRODUCTS FOR GENERATING DIGITAL MULTIMEDIA STORE DISPLAYS AND MENU BOARDS

[75] Inventors: Richard D. Mandeberg, Chicago; Desmond C. J. Moleski, Oak Park; Manolo B. Almagro; Joseph F. Meyer, both of Chicago, all of Ill.

[73] Assignee: Frankel & Company, Chicago, Ill.

[21] Appl. No.: 08/819,419

[22] Filed: Mar. 17, 1997

[51] Int. Cl.⁷ .................................................. G06F 17/60
[52] U.S. Cl. ............................... 705/15; 705/27; 345/328
[58] Field of Search ............................ 705/14, 15, 20, 705/27; 455/2, 3.1, 6.3; 345/327, 328

[56] References Cited

U.S. PATENT DOCUMENTS

| | | | |
|---|---|---|---|
| 5,134,716 | 7/1992 | Craig | 455/66 |
| 5,412,416 | 5/1995 | Nemirofsky | 348/10 |
| 5,566,353 | 10/1996 | Cho et al. | 455/2 |
| 5,642,484 | 6/1997 | Harrison, III et al. | 395/214 |
| 5,680,721 | 10/1997 | Hine, Jr. | 40/61 |
| 5,704,049 | 12/1997 | Briechle | 395/326 |
| 5,732,216 | 3/1998 | Logan et al. | 395/200.33 |
| 5,740,549 | 4/1998 | Reilly et al. | 705/14 |

FOREIGN PATENT DOCUMENTS

| | | |
|---|---|---|
| 2 596 605 | 10/1987 | France . |
| 2596605 | 10/1987 | France . |
| WO 95/01703 | 1/1995 | WIPO . |
| WO 96/08113 | 3/1996 | WIPO . |

OTHER PUBLICATIONS

International Search Report, PCT/US98/00513, May 20, 1998.

Olson et al., "Getting It Together", Supermarket News, v. 46, n. 28, Jul. 8, 1996, pp. 22A–23A.

Cobb, "Technology on Display", Marketing, Jun. 22, 1995, pp. 27–30.

Fox, "POS Goes Multimedia: Retailers Test New Applications", Chain Store Age Executive, vol. 71, No. 2, Feb. 1995, pp. 43–46.

Lendrup, "Information and Distribution Systems in the Retial Industry", Proceedings of the Fifth IEEE Computer Society Workshop on Future Trends of Distributed Computing Systems, 1995, pp. 242–249.

Teorey et al., "A Logical Design Methodology for Relational Databases Using the Extended Entity–Relationship Model", Computing Surveys, vol. 18, No. 2, Jun. 1986, pp. 197–222.

*Primary Examiner*—Allen R. MacDonald
*Assistant Examiner*—Hani M. Kazimi
*Attorney, Agent, or Firm*—Foley & Lardner

[57] ABSTRACT

Digital multimedia presentations are assembled at a central location for stores. Start and end times are assigned. The digital multimedia presentations and the assigned start and end times are transmitted to and received at the stores. The received presentations are stored in digital multimedia players at the stores. Upon occurrence of an assigned start time, the associated digital multimedia presentation is automatically played in the store until the assigned end time. If a presentation is not available at a particular time, a generic default presentation is played. The presentations may be played at assigned start and end times until an expiration date, after which it is automatically deleted from the digital multimedia player. The digital multimedia presentations may be customized at the central location and/or at the stores. The present invention is particularly applicable for generating menu boards for an enterprise which includes multiple sites.

5 Claims, 14 Drawing Sheets

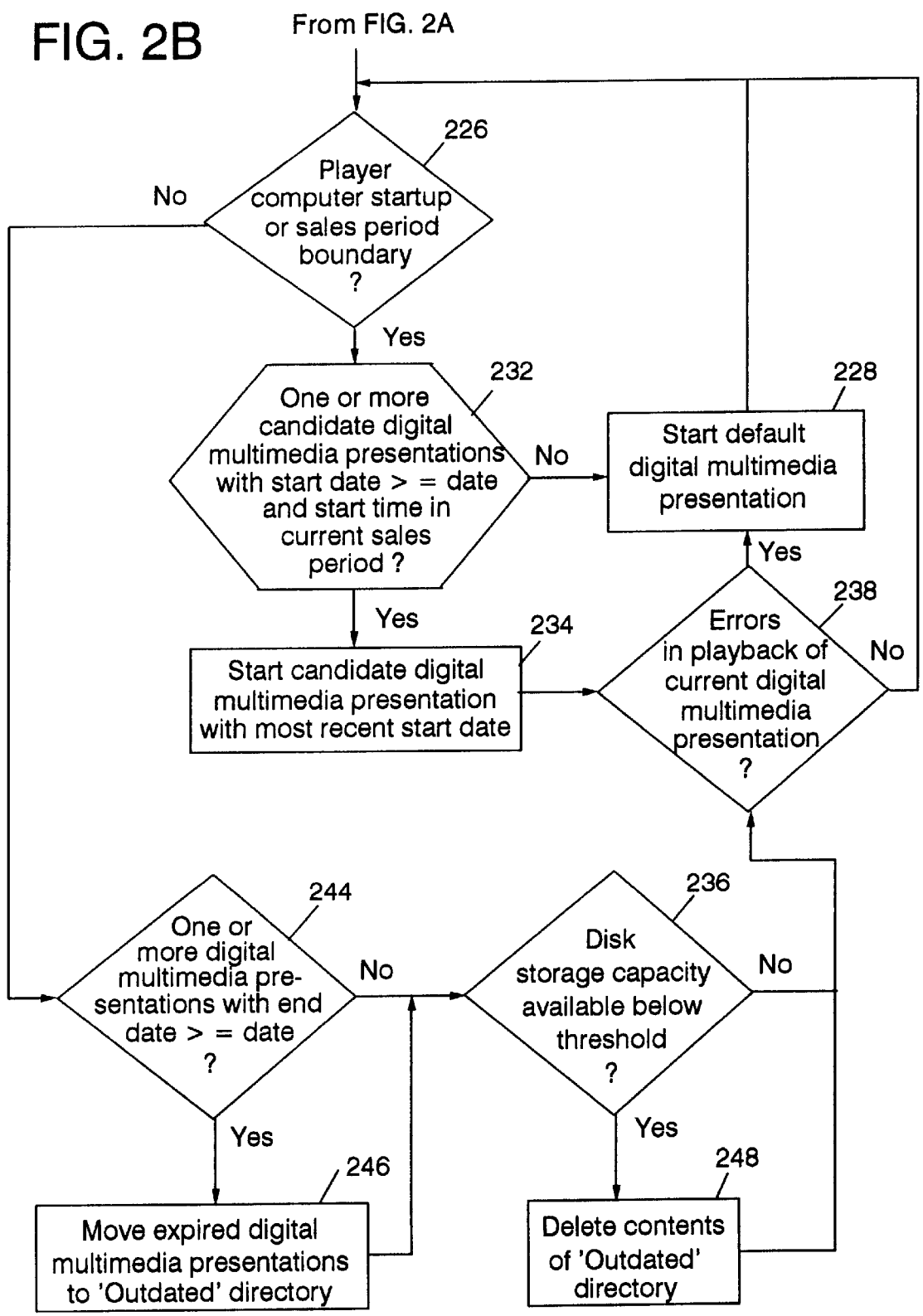

SYSTEMS, METHODS AND COMPUTER PROGRAM PRODUCTS FOR GENERATING DIGITAL MULTIMEDIA STORE DISPLAYS AND MENU BOARDS

FIELD OF THE INVENTION

This invention relates to information processing systems, methods and computer program products, and more particularly to store systems, methods and computer program products.

BACKGROUND OF THE INVENTION

Information processing systems, methods and computer program products are being increasingly used in the store environment. For example, information processing systems may be used for inventory control, point-of-sale and accounting systems. Stores may include wholesale or retail stores or any other consumer environment such as movie theaters, airports, shopping malls, arenas, and other such venues. Information processing systems continue to play an increasing role at restaurant chains such as "fast food" restaurant chains which include a large number of restaurant sites. Information processing control of distribution, promotion and other activities is increasingly being used to coordinate the large number of restaurant sites.

With the advent of the personal computer, multimedia presentations are also increasingly being used in commercial and consumer environments. Multimedia presentations may include text, graphics, audio and full motion digital video which are integrated into a single presentation.

Attempts have been made to use multimedia presentations in the store environment. See, for example, U.S. Pat. No. 5,412,416 to Nemirofsky entitled "Video Media Distribution Network Apparatus and Method" and International Application WO 96/08113 to Cho et al. entitled "Point of Purchase Video Distribution System". See also the publication entitled *"POS Goes Multimedia: Retailers Test New Applications"* by Fox, Chain Store Age Executive, Vol. 71, No. 2, February, 1995, pp. 43–46. However, notwithstanding these attempts, there continues to be a need for improved systems, methods and computer program products for generating store displays.

SUMMARY OF THE INVENTION

The present invention includes methods, systems and computer program products for generating store displays for a plurality of stores. Digital multimedia presentations are assembled at a central location for the plurality of stores. Start and end times are assigned to the digital multimedia presentations for the stores. The digital multimedia presentations and the assigned start and end times are transmitted to the plurality of stores and are received at the stores. The received digital multimedia presentations are stored in digital multimedia players at the stores. Upon occurrence of an assigned start time, the associated stored received digital multimedia presentation is automatically played on a digital multimedia display in the store until occurrence of the assigned end time for the associated digital multimedia presentation. Thus, digital networks and digital multimedia presentations are used to effectively generate digital multimedia store presentations.

In a preferred embodiment of the present invention, a digital multimedia default presentation is also generated at the central location for the plurality of stores. The digital multimedia default presentation is free of (i.e. it does not include) a start time and an end time. The digital multimedia default presentation is transmitted, received and stored in the digital multimedia players at the stores. At the stores, it is detected that an assigned end time for an associated digital multimedia presentation has occurred, and that a start time for a second digital multimedia presentation does not correspond to the assigned end time. Upon this occurrence, the digital multimedia default presentation is automatically played so that the digital multimedia display always plays a multimedia presentation. Similarly, it may be detected at the store that termination of a digital multimedia presentation has occurred prior to the assigned end time, for example because of an error or other reason. In this case, the digital multimedia default presentation is automatically played on the digital multimedia display in the store.

The digital multimedia presentations also preferably include start and end dates which are also transmitted and received at the stores. The received digital multimedia presentation is automatically played on the digital multimedia display in the store upon occurrence of an assigned start time which is between the assigned start date and the assigned end date. After expiration of the assigned end date, the stored digital multimedia presentation is deleted from the digital multimedia player at the store. Thus, digital multimedia presentations may be played at predetermined times during the day, for a period of days between an assigned start day and end day. Thereafter, the presentation is deleted to make room for other presentations on the digital multimedia player.

The digital multimedia presentations are preferably customized for selected ones of the plurality of stores. When customized, a store identification may be provided and the customized digital multimedia presentations are transmitted to the identified stores.

Customization may be provided at the central location by accepting customization data related to the selected ones of the stores. Alternatively, customization may take place at the individual store by providing customized data, for example concerning prices or sales periods at the stores. Customization may also take place both at the central location and at the stores. A feedback mechanism may also be provided wherein effectiveness of the digital multimedia presentation in the store is measured, for example by analyzing sales data. If an indication is received that the digital multimedia presentation is not effective, a new multimedia presentation may be assembled, transmitted, received, stored and automatically played.

Transmission may take place using a wide area network such as a wired wide area network, a wireless network and the internet. The digital multimedia presentation may be presented on a display which is a virtual display comprising a plurality of display devices arranged in an array. According to another aspect of the invention, customer inputs may be accepted to provide interactive digital multimedia presentations at the store.

The present invention is particularly applicable for generating menu boards for an enterprise such as a restaurant chain, which includes a plurality of sites such as restaurant sites. As is well known to those having skill in the art, menu boards are generally placed above a counter in a restaurant and include an identification of items sold at the particular restaurant, as well as the associated prices. A time of day may also be identified, for example for a breakfast menu. Special promotions may be identified, such as "value meals" or other limited-time promotions. The present invention allows replacement of the static menu board with a digital multimedia menu board which can be displayed on a virtual display including a row or array of multimedia monitors.

Digital multimedia menu presentations are assembled at a central location. The presentations include a menu of items which are sold at the restaurant chain and digital multimedia presentations for selected ones of the menu items to advertise promotions. The digital multimedia presentations may include audio, text, graphics and full motion digital video.

For each restaurant site, a restaurant site specific menu is generated which comprises selected ones of the items from the menu of items which are sold at the restaurant chain, the associated prices for the restaurant site, and the restaurant-specific multimedia advertisements, to form a customized digital multimedia menu board for each restaurant site, including menu items offered at the restaurant site, the associated prices and the multimedia advertisements concerning the menu items. Thus, for example, a nationwide restaurant chain may be running different promotions and may be selling different items in different parts of the country. The prices will also generally vary from store to store. Thus, for each restaurant site, a site-specific menu is generated.

The customized digital multimedia presentation is then transmitted from the central location to the associated restaurant site and is received at the associated restaurant site. The received customized digital multimedia presentation is then stored in a digital multimedia player at the restaurant site. The customized digital multimedia presentation is then automatically played on a digital multimedia menu board at the restaurant site, so that the digital multimedia menu board indicates the menu items and prices and advertisements for items which are presently being sold at the restaurant site.

According to another aspect of the present invention, start and end times are assigned for the digital multimedia presentations for each restaurant site, and the start and end times are transmitted and received at the restaurant site. Then, the customized digital multimedia presentation is automatically played from the assigned start time until the assigned end time. Thus, for example, a digital multimedia menu board for breakfast may only be played from 7:00 AM–11:00 AM, and this time can vary from day to day. Thereafter, a lunch menu board may be displayed.

According to another aspect of the present invention, a digital multimedia default menu presentation is also generated, transmitted, received and stored. Then, if an assigned end time for a digital multimedia presentation occurs and a start time for a second digital multimedia menu presentation is not present, the digital multimedia default menu presentation may be played. Accordingly, for example, if a new lunch menu has not been received, a default lunch menu may be displayed until the new lunch menu is received. Thus, it can be ensured that the digital multimedia menu board never displays a blank menu board. Similarly, if a digital multimedia menu presentation terminates prematurely due to an error or other occurrence, the default menu board may be played so that the digital multimedia menu board is never blank.

According to another aspect of the present invention, start and end dates are provided for the digital multimedia menu presentations for the restaurant sites. The start and end dates may be provided to accommodate price changes, new promotions and new items which are added to the menu board. Thus, the digital multimedia menu presentations are presented between the assigned start and end times and between the start and end dates. After the end date, the stored digital multimedia menu presentation is deleted from the digital multimedia player at the restaurant site, to free up storage space.

According to another aspect of the invention, customization data may also be provided for the restaurant site. For example, a customized list of items which are sold at the restaurant site may be provided centrally, but the prices may be entered at the individual restaurant site. Similarly, local promotions to meet competitive prices may also be entered at the local sites.

The digital multimedia menu boards may also be tied to a point-of-sale system at the restaurant site, which measures effectiveness of the promotions which are advertised on the menu boards. Thus, if point-of-sale data indicates that the promotions on the menu board are not being effective, this indication may be provided to the central location and new digital multimedia presentations may be assembled and transmitted to the store to provide a new presentation. The presentations on the menu board or on another kiosk in the store may also be made interactive by responding to customer inputs to provide interactive presentations. Multilingual presentations may also be provided.

BRIEF DESCRIPTION OF THE DRAWINGS

FIGS. 2A and 2B are flowcharts illustrating an operational overview of systems, methods and computer program products for generating store displays for a plurality of stores according to the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Overview

Figure 1:
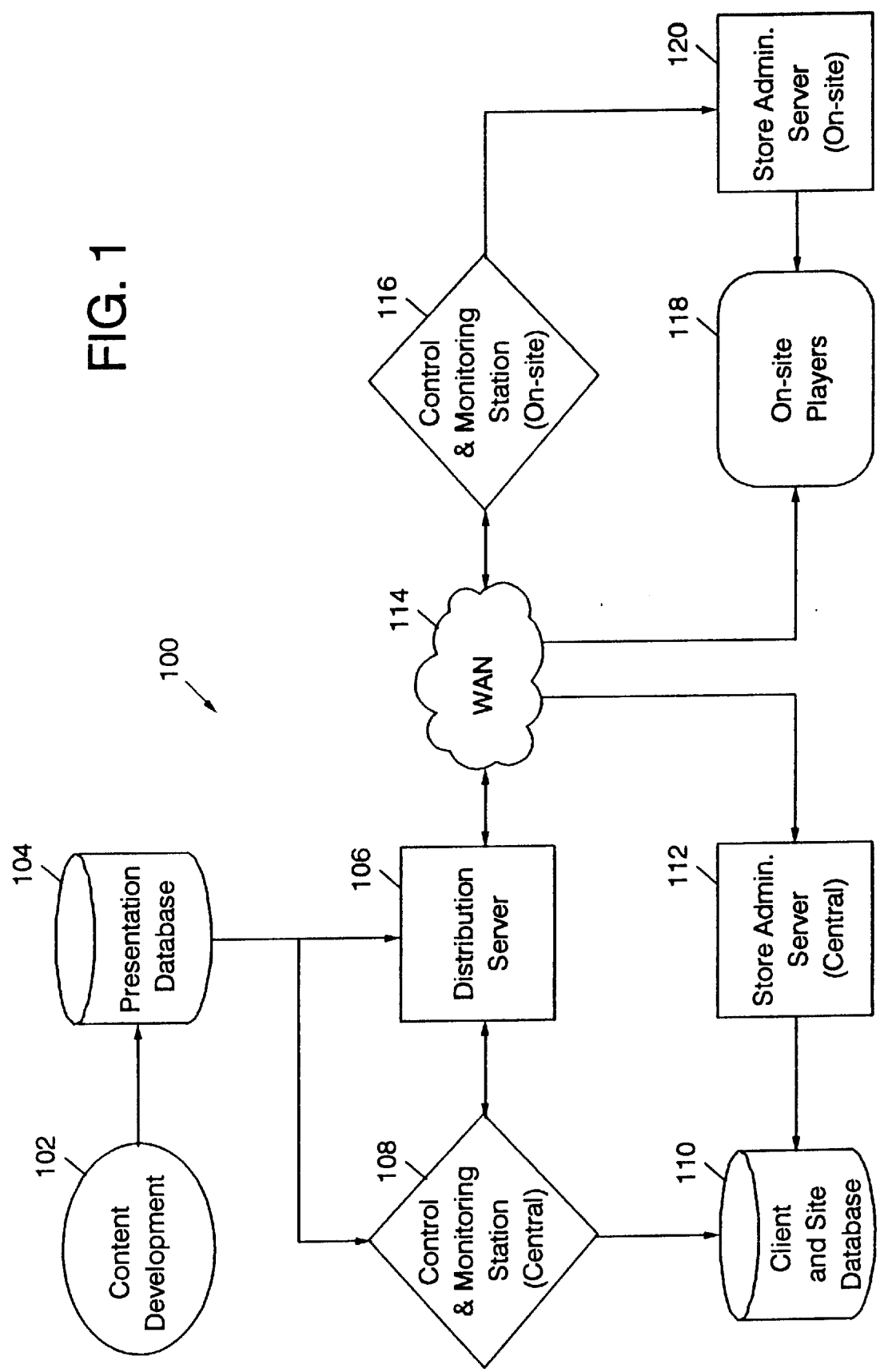
FIG. 1 is an overall block diagram of systems, methods and computer program products for generating digital multimedia store displays and menu boards according to the invention.

Referring now to FIG. 1, an overall block diagram of systems, methods and computer program products for generating digital multimedia store displays and menu boards according to the invention is illustrated. As shown in FIG. 1, system 100 may be used to distribute, manage, monitor and display digital multimedia presentations in store environments. The digital multimedia presentations may serve a promotional, operational, or "edutainment" (education/entertainment) function. By using digital multimedia presentations, the present invention can leverage the strengths of network distribution including rapid updating, improved process management, dynamic integration of multiple data sources and robust control over remote playback.

Promotional applications may include in-store marketing efforts which are targeted to motivate desired consumer behavior by increasing consumer awareness. For example, digital multimedia presentations may highlight product availability or specific in-store incentives to motivate product purchase. Operational presentations may include features which are central to the functioning of the store, for example a fast food restaurant menu board. Finally, edutainment applications may be used to provide computer-based activities to consumers or store personnel that are either educational or entertainment, or both. Examples may include staff training, motivational messaging or computer games. Regardless of the content, the digital multimedia presentations may be assembled, transmitted, received and played at the stores using the same software and hardware infrastructure, described below.

Accordingly, the present invention may be used to generate revenue, reduce costs, and/or increase consumer traffic. As a revenue generator, the promotional applications may create a new in-store medium that can be sponsored or cofunded by participating companies, similar to television advertisements. The operational applications can reduce the amount of materials and labor which are currently expended for the same tasks. Finally, the edutainment applications can be the basis for an in-store experience that motivates consumers to visit a given store or motivates staff retention and effectiveness.

It will be understood that the digital multimedia presentations may be passive or interactive. The digital multimedia presentations may respond to direct consumer input. For example, a promotional application can be presented on a touch-screen device which changes the type of information displayed in response to consumer selections.

FIG. 1 is a block diagram of systems, methods and computer program products for generating store displays according to the present invention. As shown in FIG. 1, system 100 includes an apparatus and/or a step for assembling at a central location, digital multimedia presentations for the plurality of stores. This apparatus or step is indicated in FIG. 1 as "content development" 102. Digital multimedia presentations which are developed are stored in a presentation database 104 at the central location and are staged for distribution through a distribution server 106 at the central location. Applications are distributed through a wide area network (WAN) 114 to on-site players 118. Information about the digital multimedia presentations in the stores may be transmitted back to the distribution server 106 where it is stored in a client and site database 110.

Continuing with the description of FIG. 1, digital multimedia presentations which are assembled during content development 102, may include full motion digital video, still images, computer-generated animation, print prepress files, text and/or audio. The content is assembled into a complete digital multimedia presentation and stored in the presentation database 104. The details of assembling digital multimedia presentations will be described below. All approved digital multimedia presentations in the presentation database 104 are available for scheduling and transmission to the on-site players 118, as will be described in detail below.

The central control and monitoring station 108 enables a system operator to collect data from the client and site database 110 and the presentation database 104 in order to create digital multimedia presentation packages for each site. The digital multimedia presentation for each site may be determined in part by specific instructions or data from the various sites, which may be entered at the on-site control and monitoring station 116 and which is received and processed through the store administration server (central) 112. The central control and monitoring station 108 issues commands to distribute the assembled digital multimedia presentations from the presentation database 104 via the distribution server 106.

Digital multimedia presentations are distributed from the central location, to the plurality of stores, using a wide area network (WAN) 114. Thus, the blocks of FIG. 1 to the left of WAN 114 are at a central location, whereas the blocks to the right of WAN 114 are at an individual store. It will be understood that the central location may include a plurality of discrete sites which act as distribution points for the stores. Similarly, the various components for the stores need not be physically located in the stores, except for the digital multimedia display of the on-site players 118. Rather, these components may be included at another location associated with the store. The distribution of the digital multimedia presentations from the central locations to the stores may be managed by large multimedia file distribution software such as CreativePartner™, which is marketed by emotion Incorporated, Palo Alto, Calif.

At the stores, the digital multimedia presentations may be received, disassembled and stored in the on-site players 118. Client instructions or other on-site data such as point-of-sale information can be integrated into the digital multimedia presentations on the on-site players 118. Relevant data about the digital multimedia presentations and the state of the on-site players 118 may be recorded and transmitted to the distribution server 106. A system operator at the control and monitoring station 108 can view this data.

After a predetermined end date, the digital multimedia presentation is retired and replaced by another presentation which is delivered to the on-site player 118 as described above. Alternatively, a site-specific default presentation, which is always present on each on-site player 118, may be used. The default presentation is designed to be appropriate for on-site display at any time for a given client.

The system 100 is preferably designed to allow most digital multimedia presentations to play without any action on the part of on-site personnel. However, there may be some functions for which it is useful to provide control and management tools to the store manager, such as selecting from among multiple implementations of a particular digital multimedia presentation, or setting the store hours or schedule for a particular store. This on-site customization may be obtained using the on-site control and monitoring station 116 and the store administration server 120, as will be described below.

Operational Overview

Figure 2A:
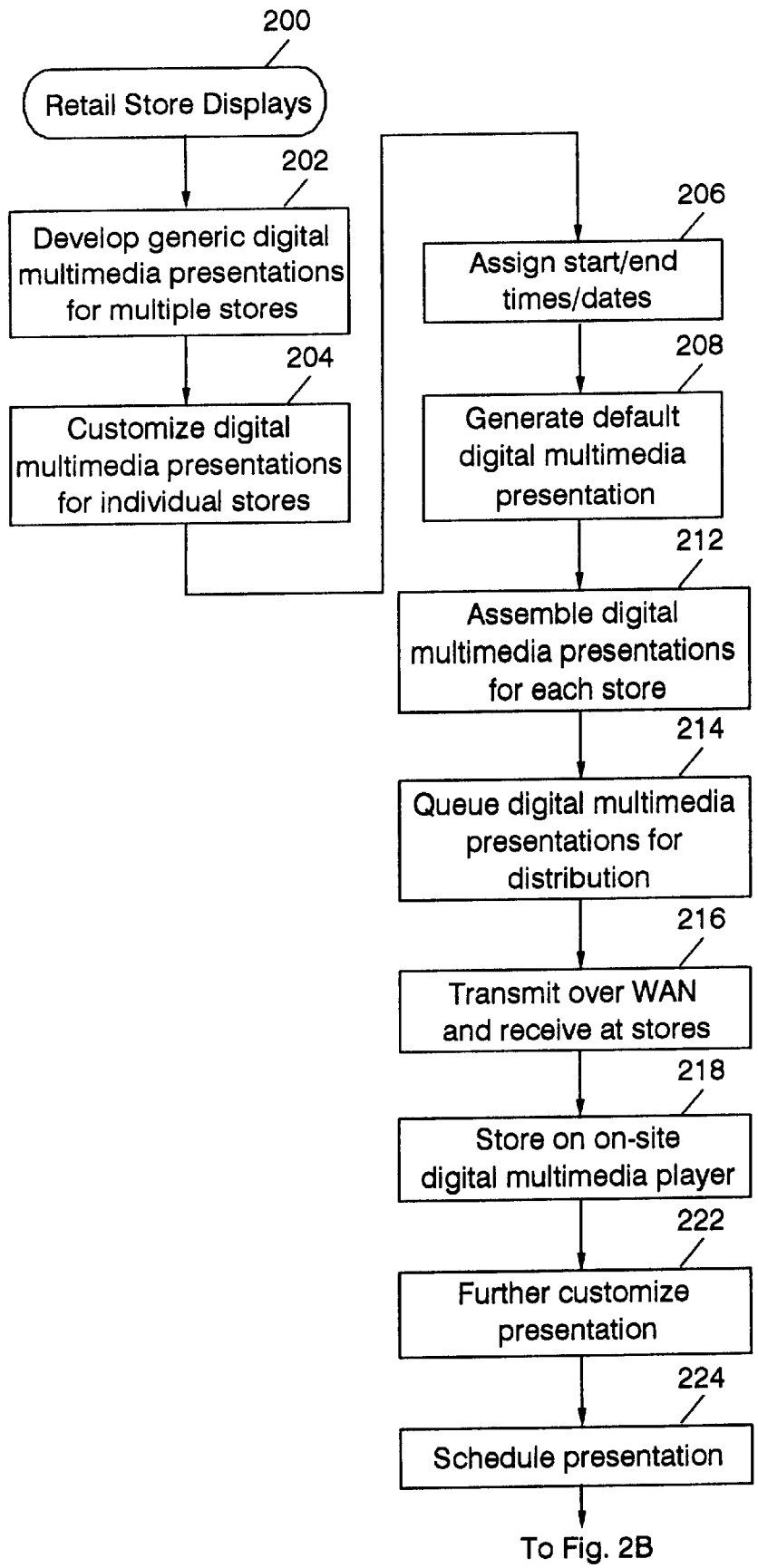

Referring now to FIGS. 2A and 2B, an operational overview of systems, methods and computer program products for generating store displays for a plurality of stores will be described.

As will be appreciated by one of skill in the art, the present invention may be embodied as a method, data processing system and/or computer program product.

Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer-readable medium may be utilized including hard disks, CD-ROMs, optical storage devices, or magnetic storage devices.

The present invention is described below with reference to flowchart illustrations of methods, apparatus (systems) and computer program products. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring now to FIGS. 2A and 2B, store displays 200 are generated by first developing or assembling generic digital multimedia presentations for multiple stores (Block 202). For example, when the store displays are menu boards for a restaurant chain, digital multimedia menu presentations including a menu of items which are sold at the restaurant and digital multimedia presentations such as advertisements for selected ones of the menu items are generated. These digital multimedia presentations are generally developed by creative professionals at advertising agencies or clients. After a generic presentation is assembled, it is released to distribution and stored in the presentation database 104 of FIG. 1 where it awaits assembly and distribution.

At Block 204, the digital multimedia presentations are customized for individual stores. Customization may take place by generating for each restaurant site, a restaurant site-specific menu comprising selected ones of the items from the menu of items which are sold at the restaurant chain, the associated prices for the restaurant site, and restaurant-specific multimedia advertisements, to form a customized digital multimedia menu board for each restaurant site including menu items offered at the restaurant site, the associated prices, and multimedia advertisements concerning the menu items.

It will be understood that customization may take place independent of store input. However, preferably, instructions or data gathered from the store sites may impact the presentation customization at Block 204. Thus, presentations are preferably customized using the client and site database 110 at the control and monitoring station 108 (FIG. 1). The data in the client and site database may be obtained from the store administration server 120 at the store via the store administration server at the central location 112. It will also be understood that additional customization may take place at the stores, as will be described below.

In addition to customization, at Block 206, start and end times and start and end dates are assigned for the customized multimedia presentations. The start and end dates may indicate start and end dates for a particular menu including special products and/or prices. Start and end times may indicate when in the day a specific menu is displayed, for example breakfast, lunch and dinner menus and/or weekend or weekday menus.

At Block 208, a default digital multimedia presentation is also developed or generated. The default digital multimedia presentation preferably includes generic material for the site which may be displayed in the absence of a customized digital multimedia presentation. Absence of a customized digital multimedia presentation may take place because of an error or because it is desired to display the default digital multimedia presentation.

At Block 212, the digital multimedia presentation packages are assembled for each store. At Block 214, the digital multimedia packages are queued for distribution to the individual stores using the distribution server 106 and wide area network 114 of FIG. 1. At Block 216, the digital multimedia packages are transmitted over the WAN 114 and received at the store 216. The received customized digital multimedia presentations are stored at the associated store at Block 218.

At Block 222, further customization may be applied to the presentation. In particular, the on-site store administration server 120 of FIG. 1 may be used to provide further customization of the digital multimedia presentation. For example, the playing hours may be modified and prices may be changed. If alternative digital multimedia presentations are stored, one may be selected for presentation at the store. It will be understood that central customization and on-site customization may be used to optimize overall network resources and efficiency. It will also be understood that on-site customization may occur dynamically as the digital multimedia program is played.

Referring to Blocks 226–248, the customized digital multimedia presentations are then automatically played on the on-site player, such as a digital multimedia menu board at the associated restaurant site, so that the digital multimedia menu board indicates the menu items and prices, and advertisements for items which are presently being sold at the restaurant site. The appropriate digital multimedia presentation is played between an assigned start and end time and an assigned start and end date.

In particular, the presentations may abut each other in a serial fashion, with a succeeding presentation beginning at the end of a preceding presentation. In other instances, the valid periods for presentations may overlap in several ways. For example, a week-long special promotion presentation may supersede a quarterly seasonal presentation. For that week, the relative start dates are compared, with a preference for the presentation with the most recent start date.

Also, the start and end times which divide a day into periods may be related to a day profile which allows for several different ways of dividing days. For example, a weekend day may have a distinct set of periods from a weekday. More preferably, there is a hierarchy of preferred matching of day profiles which determines what set of time periods are in effect for a given day. These preferred matching profiles may be determined by the manner in which a date is specified. For example, a fully specified date such as Mar. 17, 1997 may have priority over a partially specified date such as 12/25, which itself may have a preference over a day of the week such as Thursday, which itself may have preference over a weekday versus weekend specification.

Accordingly, as shown at Block 226, when the player computer is started, or if the current time is a boundary between sales periods, then at Block 232, a candidate digital multimedia presentation is selected for playback. Candidate digital multimedia presentations are identified as those presentations with an assigned start date greater than or equal to the current date and with an assigned start time which falls within the current sales period. If more than one candidate presentation is available, then the candidate with the most recent or greatest assigned start date is started at Block 234. If no candidate presentations are available from Block 232, then the default digital multimedia presentation is started at Block 228.

Having started an appropriate digital multimedia presentation, control returns to Block 226. Until the next sales period boundary or player computer start-up, the player computer storage is periodically checked for outdated digital multimedia presentations beginning at Block 244. If the assigned end date of any digital multimedia presentation is less than, i.e. before, the current date, then the expired presentation is moved to the "outdated" directory at Block 246. If there are no such presentations, then at Block 236 a check is made to determine whether the available storage capacity of the player computer has fallen below a configurable threshold. When the storage capacity falls below that threshold, then the contents of the "outdated" directory are purged to make room for new digital multimedia presentations.

It will be understood that control is periodically passed through Block 238, where a test is made to determine that there is an appropriate digital multimedia presentation displayed. If that test indicates any error in the presentation playback, then the default digital multimedia presentation is displayed at Block 228.

Central Control and Monitoring Station

Figure 3:
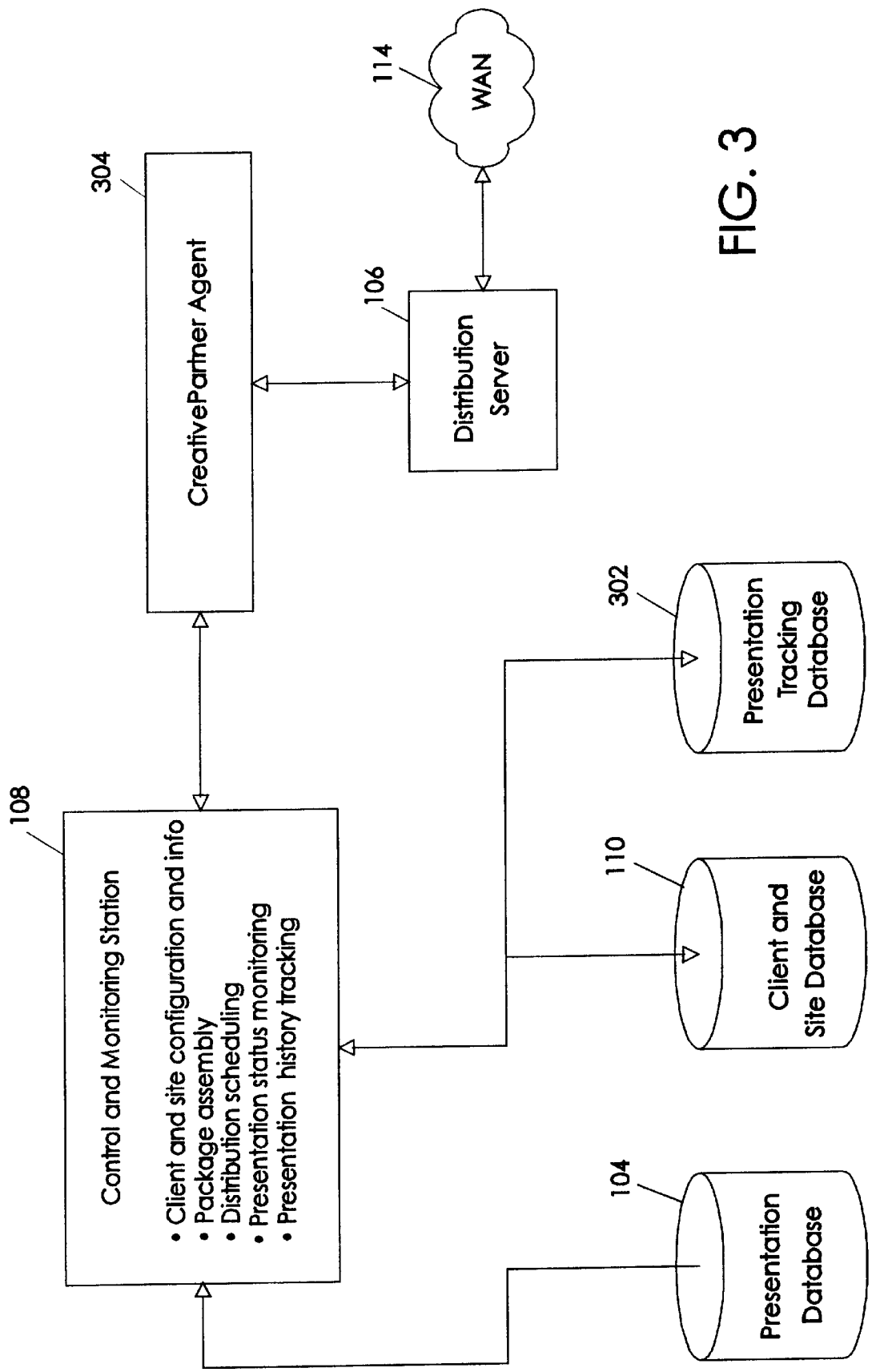
FIG. 3 is a detailed block diagram of the control and monitoring station of FIG. 1.

A detailed operational explanation of control and monitoring station 108 (FIG. 1) will now be described in connection with FIG. 3. As shown in FIG. 3, the control and monitoring station 108 includes control and monitoring software which may be accessed by a system operator to manage the client and site database 110, prepare digital multimedia presentation packages for distribution and track system status and history.

The presentation database 104 is maintained and populated by the content process described in connection with FIG. 1. The control and monitoring station 108 accesses the presentation database 104 to identify the digital multimedia presentations which are available for distribution when an operator creates a distribution package.

The client and site database 110 contains information about various enterprises related to the store business, including but not limited to contact and site information and information about the on-site player configuration and installation.

Figure 4:
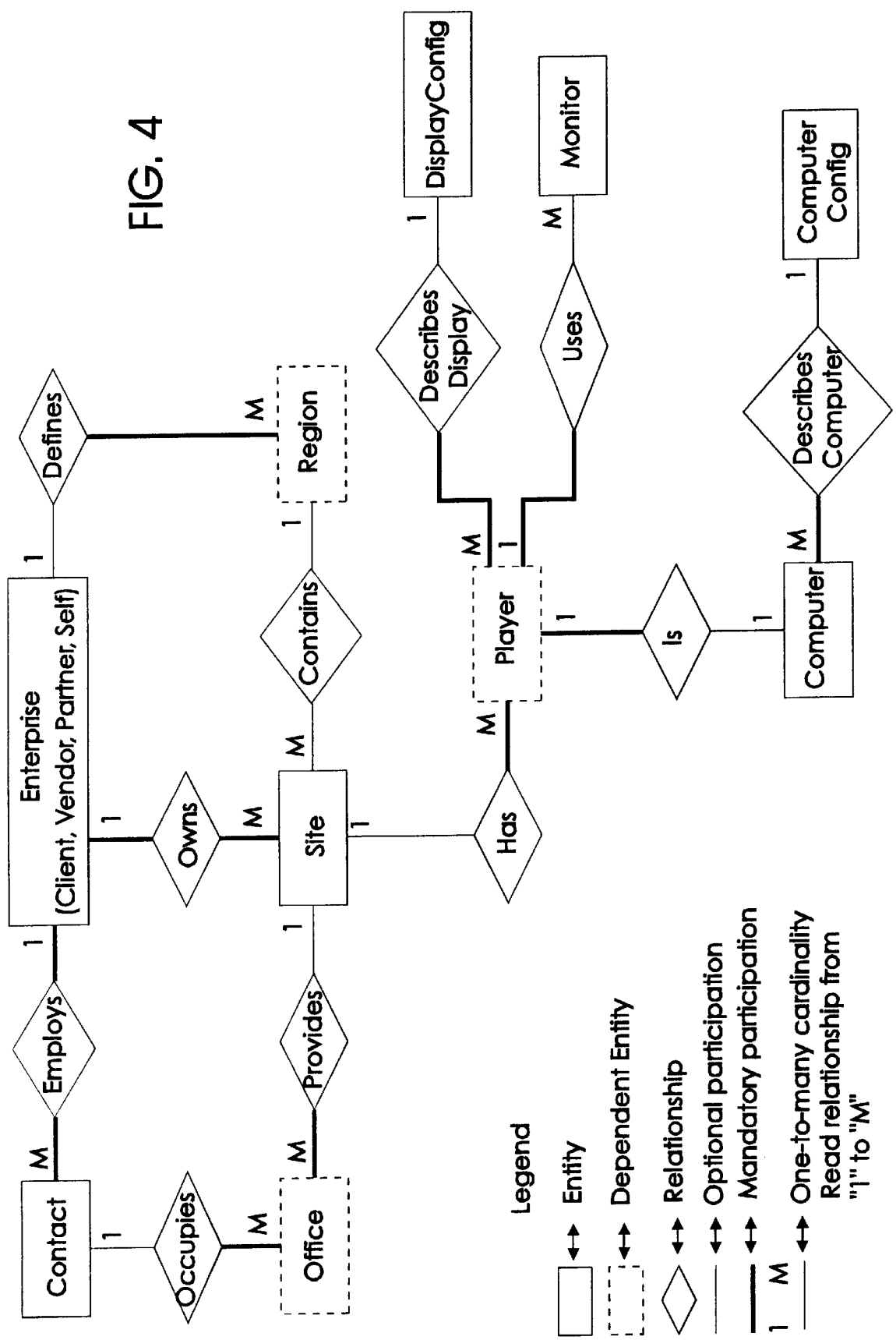
FIG. 4 illustrates an entity relationship conceptual model of the client and site database of FIG. 1.

FIG. 4 illustrates an Entity-Relationship conceptual model of the client and site database 110. The modeling of databases using entity relationships was first described by Chen. An in-depth presentation of the Entity-Relationship approach may be found in an article by Teorey et al. entitled "*A Logical Design Methodology for Relational Databases Using the Extended Entity-Relationship Model*", published by ACM Computing Surveys, Vol. 18, No. 2, June 1986, the disclosure of which is hereby incorporated herein by reference.

As shown in FIG. 4, the client and site database conceptual model represents entities and relationships, implemented in a relational database, which the control and monitoring station 108 manipulates. Enterprise entities can be an advertising agency or its clients, vendors or partners. Alternatively, enterprise entities may be the chain or restaurant chain. As shown in FIG. 4, an enterprise owns sites and employs contacts (people) who occupy one or more offices provided by an enterprise site. Enterprises may also define regions which allow many sites to be represented by a convenient shorthand notation.

Continuing with the description of FIG. 4, a player is a computer configured with a particular set of monitors at a known site. It will be understood that enterprises, contacts, computers, monitors, computer configurations and display configurations can each exist in the database independent of other entities. Thus, they are independent entities. In contrast, regions, sites, offices and players only exist in relation to one or more independent entities. As such, they are shown as "dependent" entities.

Accordingly, in order to assemble a package of digital multimedia presentations for the plurality of stores, an operator at the control and monitoring station 108 selects one or more programs from the presentation database 104, specifies destination sites from the client and site database 110 and schedules the package start and expiration dates. The information that comprises the package is stored in the presentation tracking database 302. Packages are queued for distribution to on-site players using the CreativePartner agent 304. Other multimedia distribution packages may also be employed. The CreativePartner agent 304 copies the package files to on-site players 118 via the distribution server 106 which is connected a wide area network (WAN) 114, as will be described below.

Figure 5:
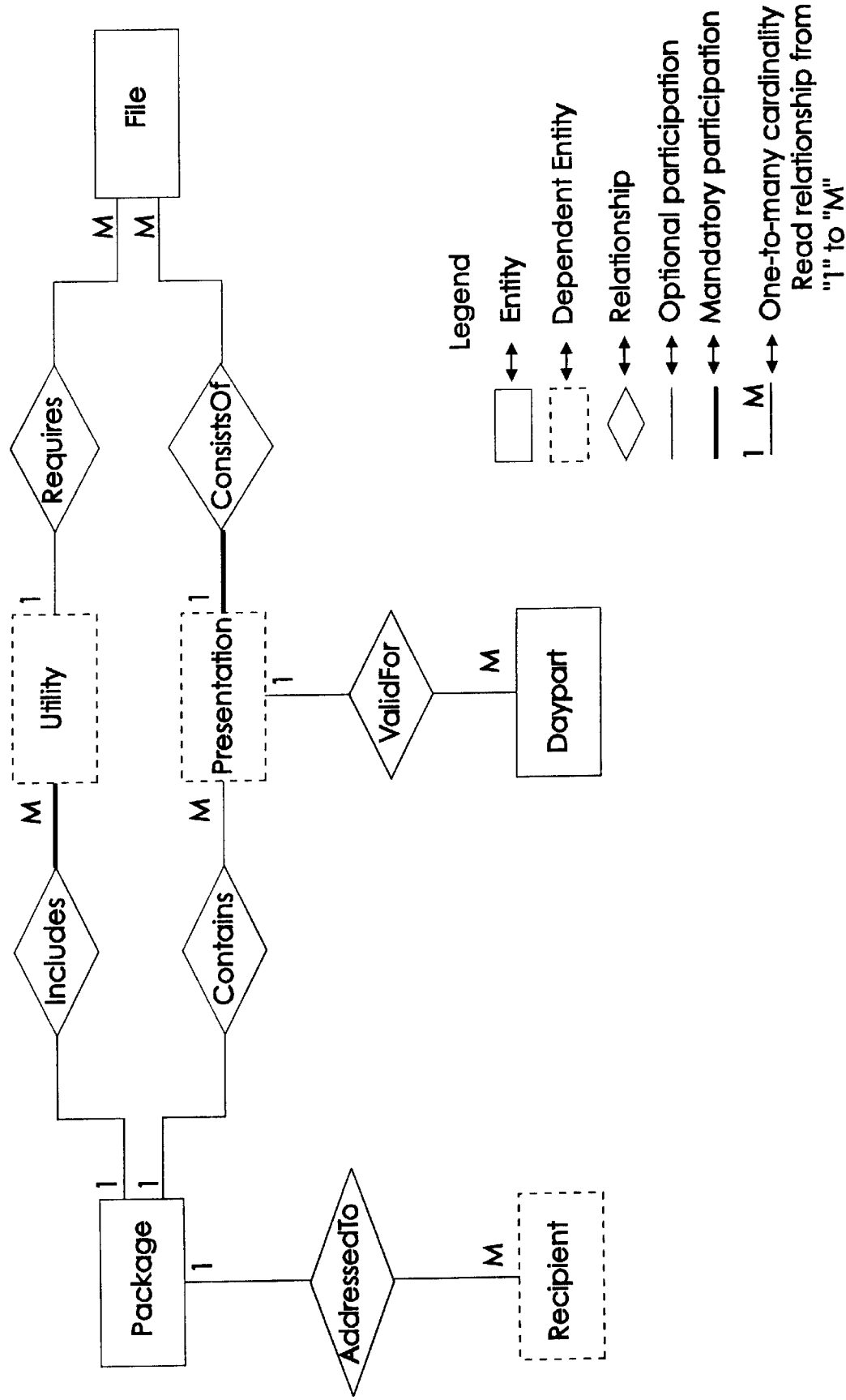
FIG. 5 illustrates an entity relationship conceptual model of the presentation tracking database of FIG. 3.

Information such as on-site player operating status and the currently displayed multimedia presentation can also be provided from the on-site players 118 via the distribution server 106 and the CreativePartner agent 304, back to the control and monitoring station 108 to be incorporated into the presentation tracking database 302. For example, a particular digital multimedia presentation may have several implementations. An on-site manager may have the option of selecting one of several implementations. The actual digital multimedia presentation which is selected at any given site can be monitored from the control and monitoring station 108 using the presentation tracking database 302. With appropriate interfaces to client point-of-sale data, this data can also be analyzed to monitor program effectiveness with respect to sales and to generate new digital multimedia presentations if a current presentation is not effective. FIG. 5 describes an Entity-Relationship conceptual model of the presentation tracking database 302.

Local and Wide Area Networks

Figure 6A:
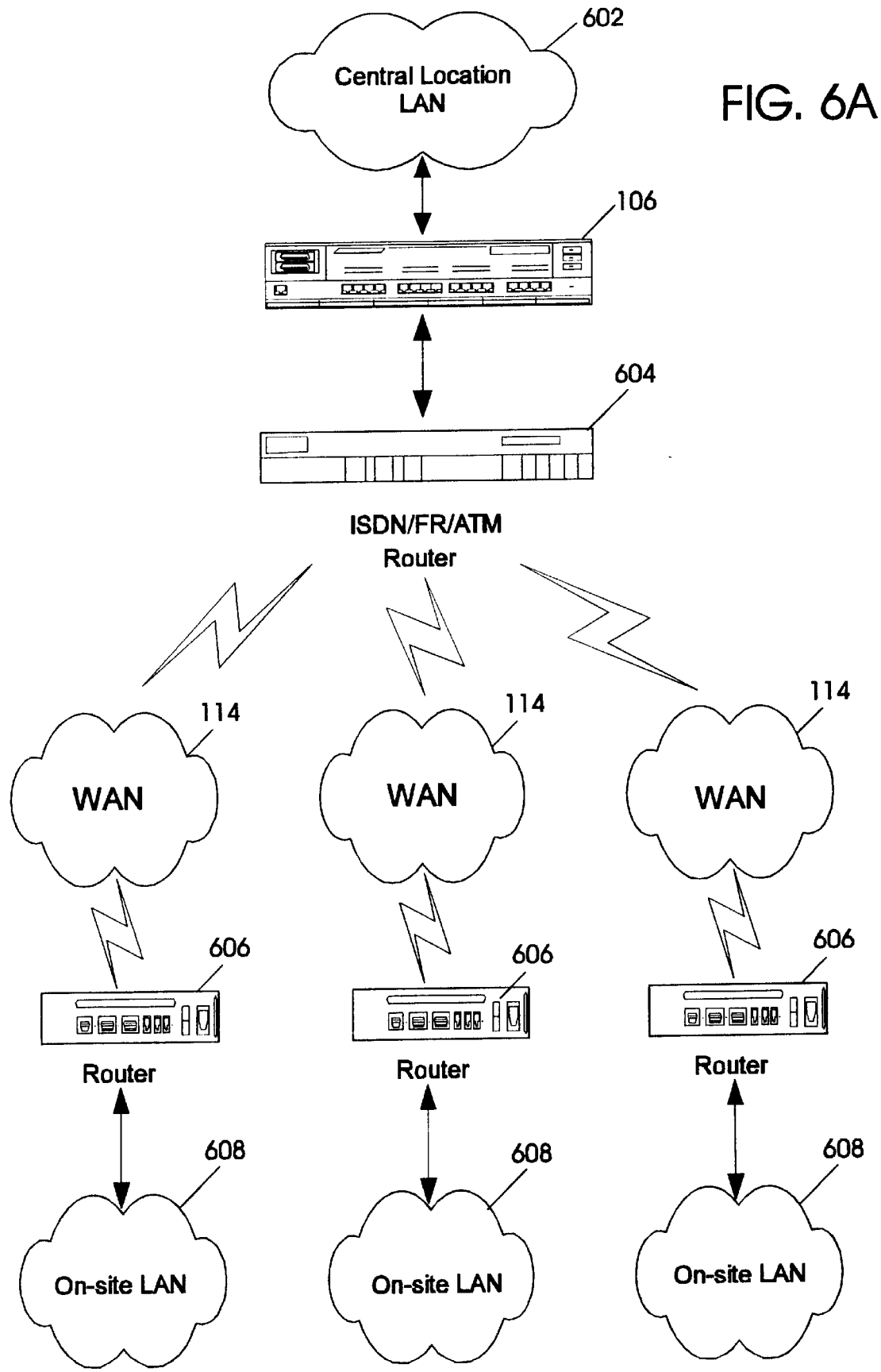
FIGS. 6A and 6B illustrate examples of wide area networks of FIG. 1.
Figure 6B:
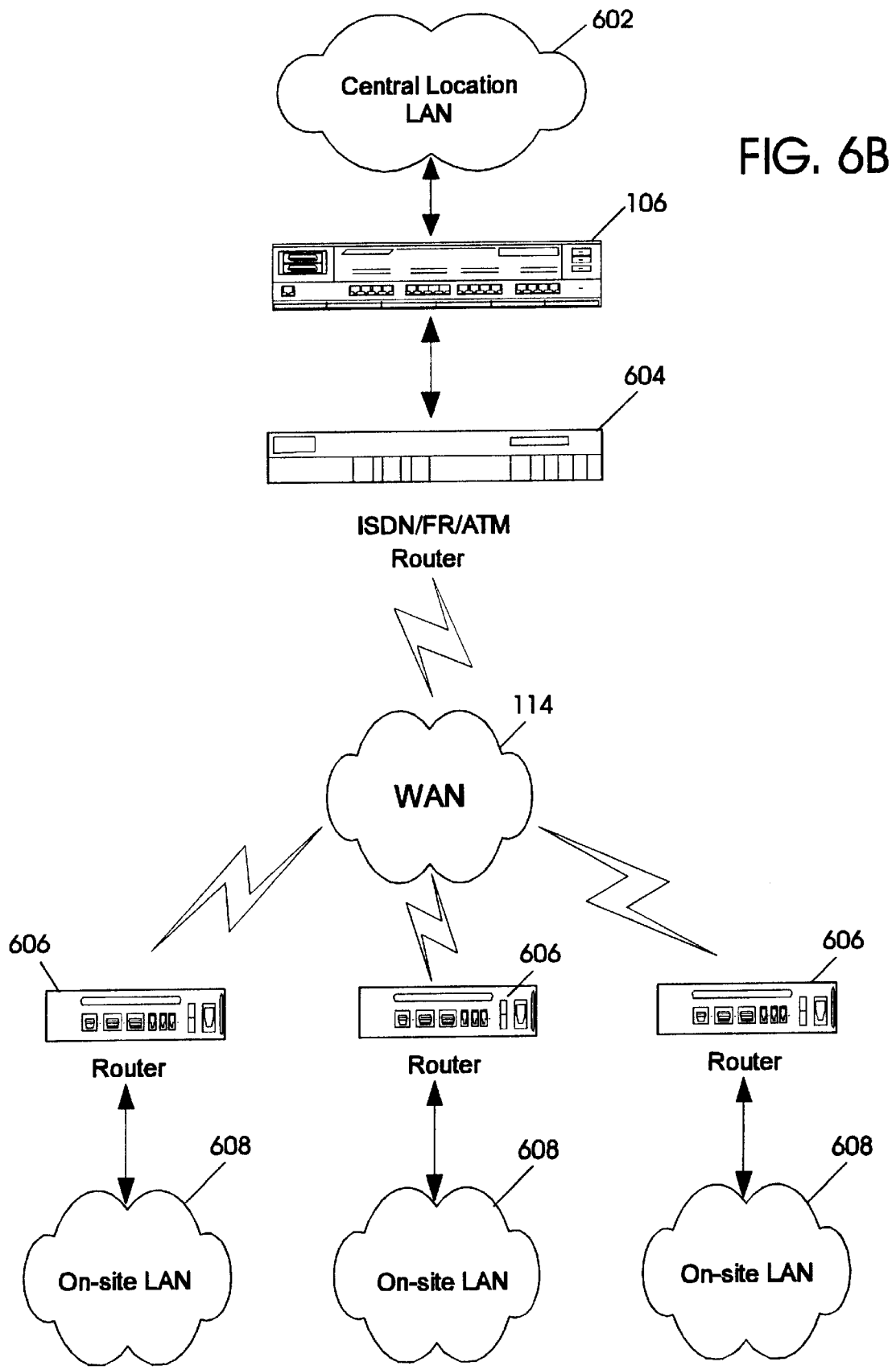

FIGS. 6A and 6B illustrate two examples of wide area networks 114 of FIG. 1. It will be understood that many other examples of wide area networks may be used. As shown in FIGS. 6A and 6B, the central location may include a distribution server 106 for the central local area network 602. An ISDN/FR/ATM router 604 may be used to route messages to one or more wide area networks 114. Client routers 606 may be used to interface local area networks 608 for each site.

Figure 7:
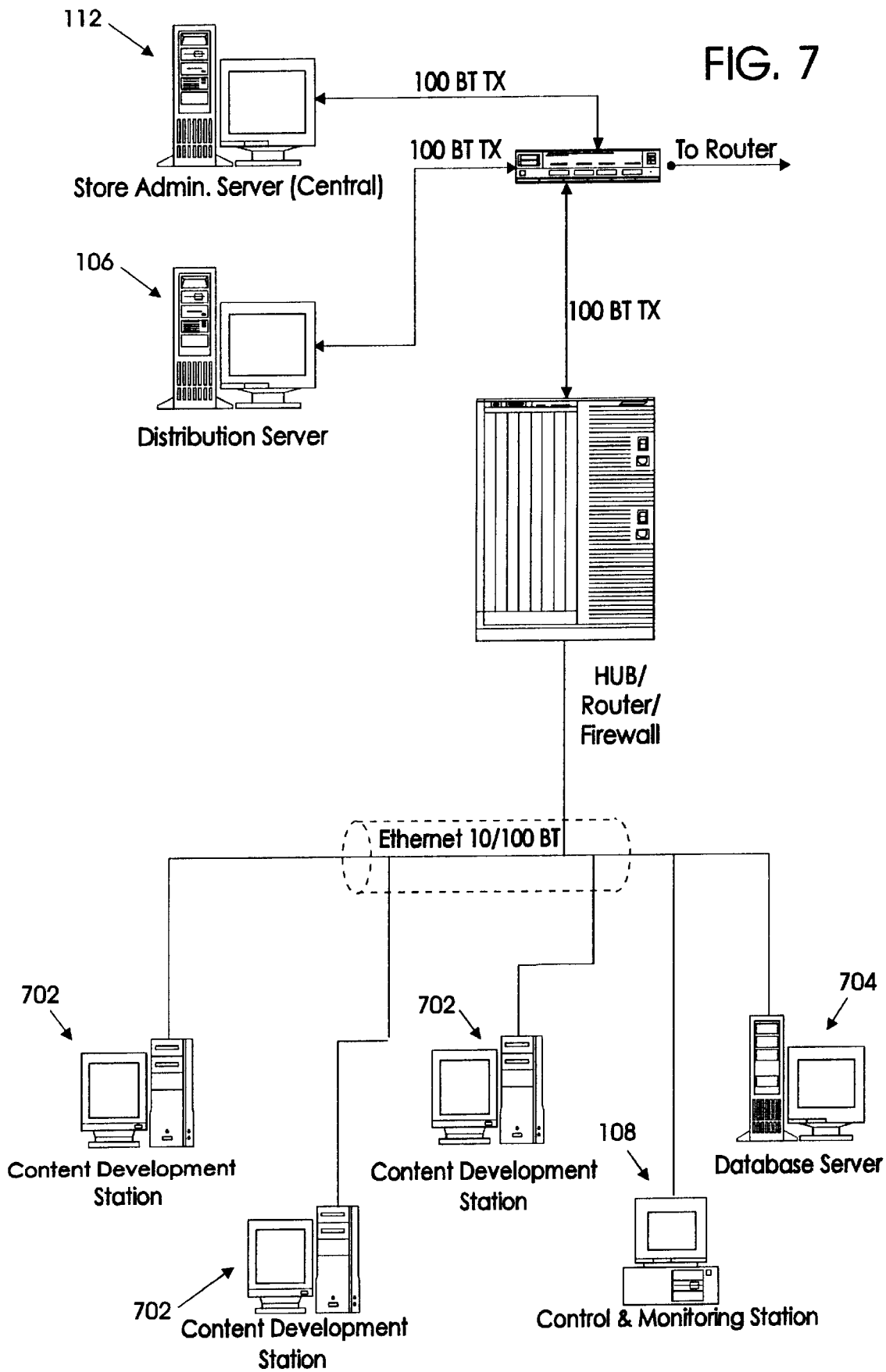
FIG. 7 illustrates a local area network which may be used at the central location of FIG. 1.

FIG. 7 illustrates a local area network which may be used at a central location to develop, store and queue digital multimedia presentations. It will be understood that many other local area networks can be used. A plurality of content development stations 702 are shown, as well as a database server 704 to serve the presentation database and the client and site database.

Figure 8:
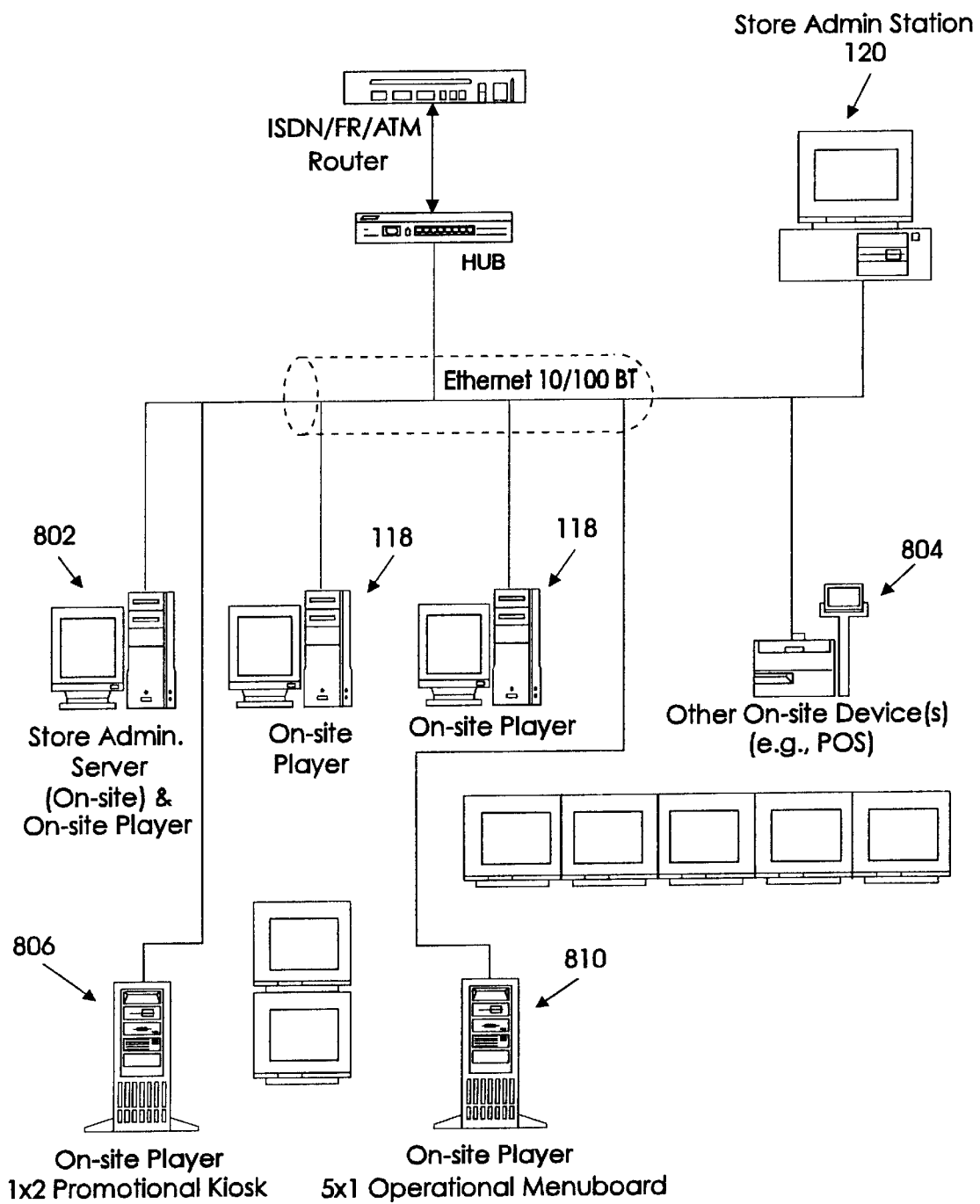
FIG. 8 illustrates an example of an on-site local area network for FIG. 1.

FIG. 8 illustrates an example of an on-site local area network which may be used at each of the stores. As shown, a plurality of on-site players 118 and a store administration station 120 may be included. The functions of an on-site player and store administration server may be combined into a single unit 802. Other on-site devices 804 such as point-of-sale devices may be included in the local area network.

In FIG. 8, two types of digital multimedia displays are shown. A kiosk 806 is shown including two separate displays therein. The displays may also be tiled to form a single virtual display. A second on-site player 810 is shown with a five-display operational menu board.

On-Site Players

Figure 9:
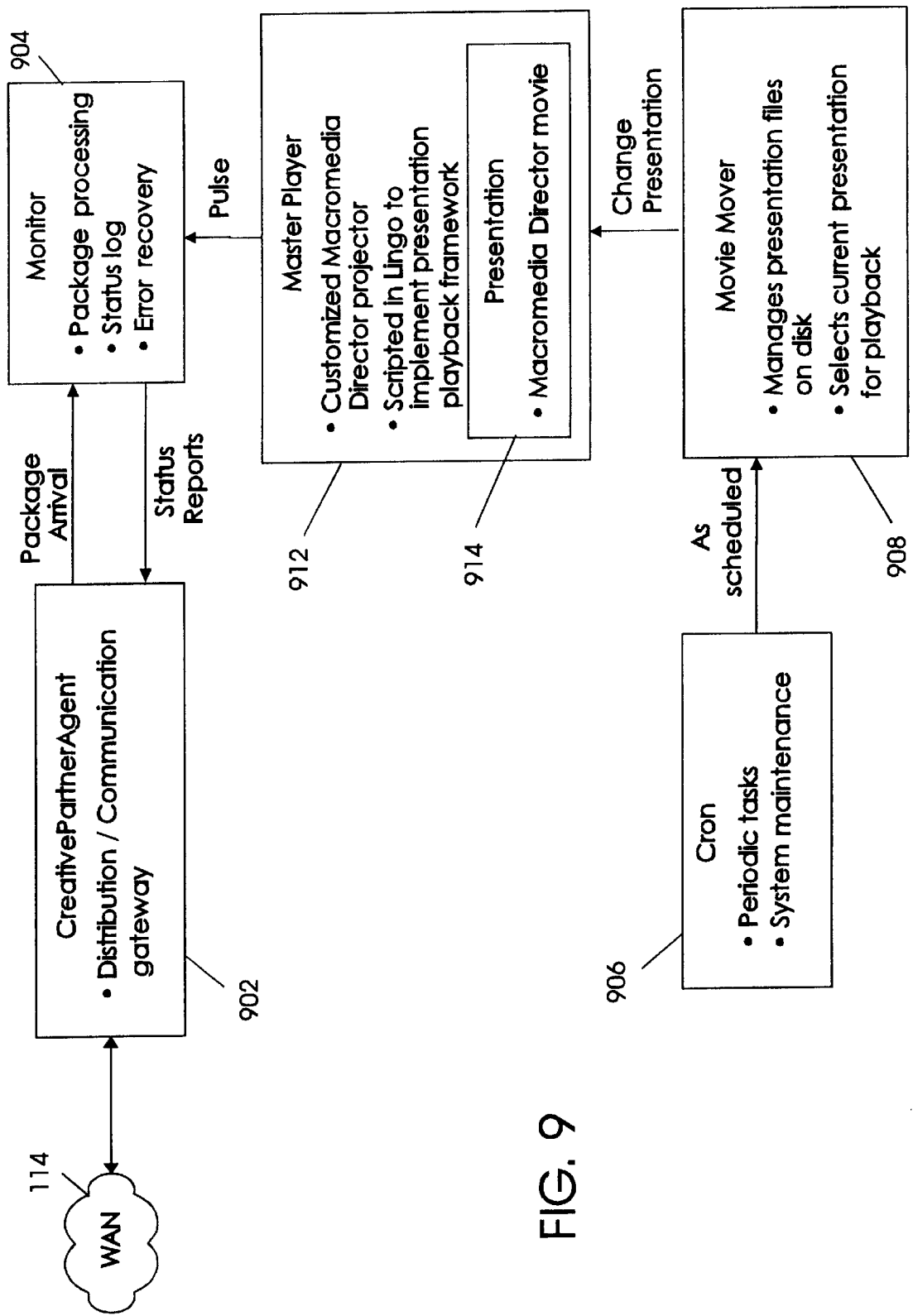
FIG. 9 is a block diagram of the on-site players of FIG. 1.

Referring now to FIG. 9, operational details of on-site players 118 (FIG. 1) will now be described. The on-site player includes a CreativePartner agent 902, monitor software 904, cron software 906, movie mover software 908 and master player software 912. Each of Blocks 902, 904, 906, 908 and 912 may represent a single software process executing on the player computer. Preferably, each player 118 includes a complete set of the player software to manage its operation.

The player software is responsible for receiving digital multimedia presentation packages, verifying package content, processing packages to schedule presentations and carry out utility maintenance, displaying scheduled presentations, and deleting expired presentations. Player software also monitors the state of the system, with regard to processes and programs that are currently running, reports status to the central monitoring system 108, and may intervene automatically for certain simple error conditions. Initial implementation of the player software may be targeted for Macintosh OS, but the individual components can be portable to other operating systems.

The descriptions of the player software components below make reference to the player's directory structure:

```
HD:
    Player:
        Drop Box:    file packages arrive in the drop box
        Schedule:    holds cron, monitor, log & schedule files
        Movies:      subdirs hold cast/movie (CXT, DXR) files
            Waiting:      movies not yet schedulable
            Now Playing:  copy of the one movie now playing
            Playable:     all currently valid movies and casts
            Outdated:     expired movies/casts (deletable)
            Default:      one movie suitable to play anytime
```

The CreativePartner Agent 902 is the gateway to the network for the player software. The monitor 904 registers with the CreativePartner Agent 902 to receive notification of package arrival. The monitor 904 also interfaces with the CreativePartner Agent 902 to upload system status reports to the central monitoring system 108.

When the monitor 904 is notified of a package arrival, the package is verified and processed, or an error report is generated if the package cannot be verified. A package includes a set of files which may include presentations, constituent media files, and utility programs with any associated data files. A package preferably includes a package description file, or PKG file, which details the file set and includes presentation scheduling information.

The PKG file format may be a simple, extensible, line-oriented text format. PKG files may be generated automatically by the central control software, but may be hand-edited for testing or exceptional circumstances. Below is a sample PKG file:

```
: Just in case we hand-edit these, any lines containing
: colon characters that aren't recognized are ignored.
: Any line with no colons is assumed to be a content-file
: name (no leading/trailing whitespace in filenames).
run: uti100 HD:Player:Movies:outdated
start date: 1/15/97 00:00:00
expire date: 2/15/97 00:00:00
dayparts: *
files:
    VALENTINE 97.DXR
    HEARTS 97.CXT
: This 'run' command happens after content files are
: processed, the other one runs before processing.
run: uti100 HD:Evince:Movies:Waiting
: A simple checksum for security/validation
checksum: 0xFF7C02A8
```

Packages are processed by monitor 904 as follows:

```
Package is validated, if files missing or checksum fails,
generate error report.
    If package is OK, then:
        •Launch pre-run utilities
        •Move content files to 'Waiting' area
        •Modify crontab/schedule as needed
        •Launch post-run utilities
        •Delete PKG file (if no other PKG files, clean dir,
          too)
        •Log entry: files listing, PKG file name.
```

Cron 906 may utilize a proven, robust UNIX utility which has been ported to most common operating environments. Cron 906 is driven by a standard format text file, called the 'crontab'. It is especially suited for scheduling repetitive tasks at fixed times. The player software system also uses cron 906 to schedule program changes that occur due to start date and expiration date arrival. Below is a sample crontab file:

```
// The fields of a crontab entry are.
//   minute hour monthday month weekday user command . . .
45    3 * * * nobody reboot
00    4 * * * nobody timesync
15    4 * * * nobody disclean
0 0 15 1 * nobody moviemover "USPS VAL97.PKG"
0 0 15 2 * nobody moviemover "USPS VAL97.PKG"
```

When the monitor 904 processes a package containing start and expire data directives, it makes entries in the crontab that correspond to those dates, which cause cron 906 to invoke the movie mover 908. The movie mover 908 manages file moves from Waiting to Playable, Playable to Outdated, selects a movie for Now Playing, and removes entries from the crontab as they are completed. It is also invoked at system startup and by the monitor 904 whenever a package is processed. The movie mover 908 uses a movie schedule file to determine its actions. If a different program is selected for Now Playing, then the movie mover 908 signals the master player 912 to synchronize the program movie changeover. Below is a sample movie schedule file:

```
01/15/97   00:00:00 playable * HEARTS 97.CXT
01/15/97   00:00:00 playable * VALENTINE 97.DXR
01/15/97   00:00:00 cleantab * USPS VAL97.PKG
02/15/97   00:00:00 outdated * VALENTINE 97.DXR
02/15/97   00:00:00 outdated * HEARTS 97.CXT
02/15/97   00:00:00 cleantab * USPS VAL97.PKG
```

The master player 912 may be a custom Macromedia Director™ or other multimedia projector which implements the framework for program playback. The major components of that framework are a 'Send Pulse' routine, and routines which synchronize the changeover from one program to another. The 'Send Pulse' routine makes a timestamped entry in the monitor 904 status log, which the monitor can then use to verify that a valid program is running. If the monitor 904 fails to receive a pulse from the master player 912, it schedules the default presentation for immediate playback and generates an error report. The master player 912 generally has one presentation 914 playing. The presentation 914 may be a Macromedia Director movie which is displayed in a subwindow of the master player process. In other words, the presentation 914 is preferably not itself a projector (self-running movie).

Together, the processes of the on-site player 118 ensure that there is always a valid promotional message displayed, manage presentation scheduling and expiration, report status information, and provide an extensible infrastructure for remotely managing the playback system without requiring intervention by on-site personnel.

Store Administration Servers (Central and On-Site)

Figure 10:
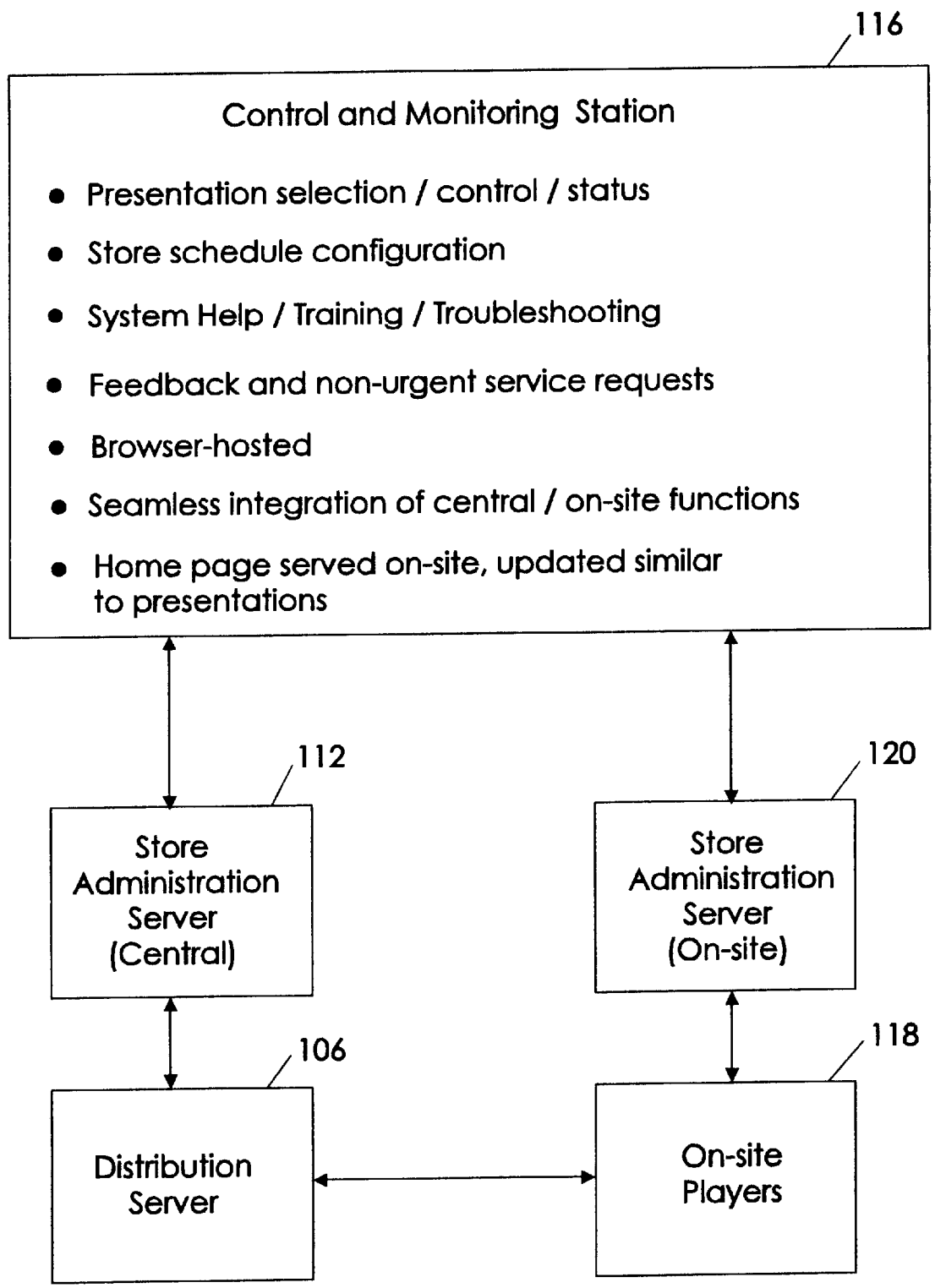
FIG. 10 is a block diagram of the on-site control and monitoring station of FIG. 1.

Referring now to FIG. 10, operational details for the central store administration server (112, FIG. 1) and the on-site store administration server (120, FIG. 1) will now be described. Although the present invention preferably allows many digital multimedia presentations to be executed without any action on the part of on-site personnel, there are some functions for which it may be useful to provide control and management tools to the store manager.

For example, some presentations may have more than one implementation, which allows the store manager to select which presentation to execute at a particular site. Presentations may also have optional controls, especially in the case of operational presentations such as a menu board, which provide for proper configuration at each site. A schedule of store opening, closing, and division of a day into differing periods may also be used in the automated presentation playback process. Since this schedule is likely to vary by location, the store manager can use the administration software to modify the schedule from the default for the client enterprise. The administration software can also provide help, training and troubleshooting with respect to the on-site operation of the system, as well as a channel for feedback and non-urgent service requests.

The actions taken by a store manager using the control and monitoring station (on-site) 116 may result in communication with either a store administration server (Central) 112 or a store administration server (On-site) 120. The store administration server (Central) 112 communicates site administration input to the distribution server 106 where that input may affect presentation distribution or presentation configuration prior to distribution. When the administration input only affects post-distribution presentation configuration, it can be handled by the store administration server (On-site) 120 which can communicate directly with the On-site Players 118 to respond to the input.

The control and monitoring station 116 can be implemented by a workstation which supports a typical worldwide web browser application, and is preferably a computer which is already in place in the store environment for administration use. Hosting the administration software using standard Internet protocols and tools such as HTTP, FTP, and HTML allows flexibility not only in the selection of the control and monitoring station 116 but also in the location of the administration functions. The store manager need not be aware of whether a particular function is implemented by a store administration server (central) 112 or a store administration server (on-site) 120. The distribution network can be used to update the content of the store administration server (on-site) 120 similar to presentation updates.

Fast-Food Restaurant Environment

Figure 11:
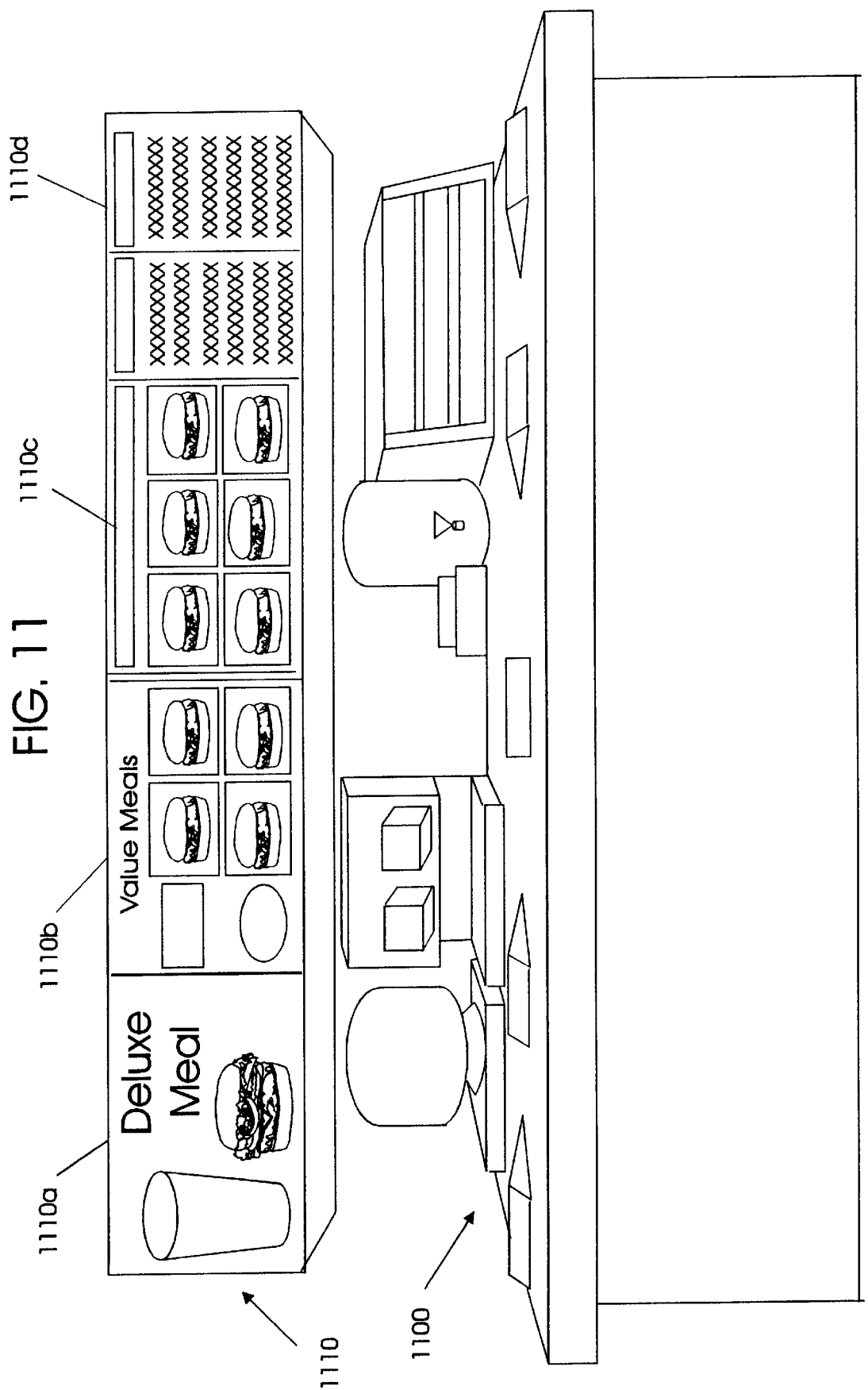
FIG. 11 illustrates a fast-food restaurant including a digital multimedia menu board according to the present invention.
Figure 12:
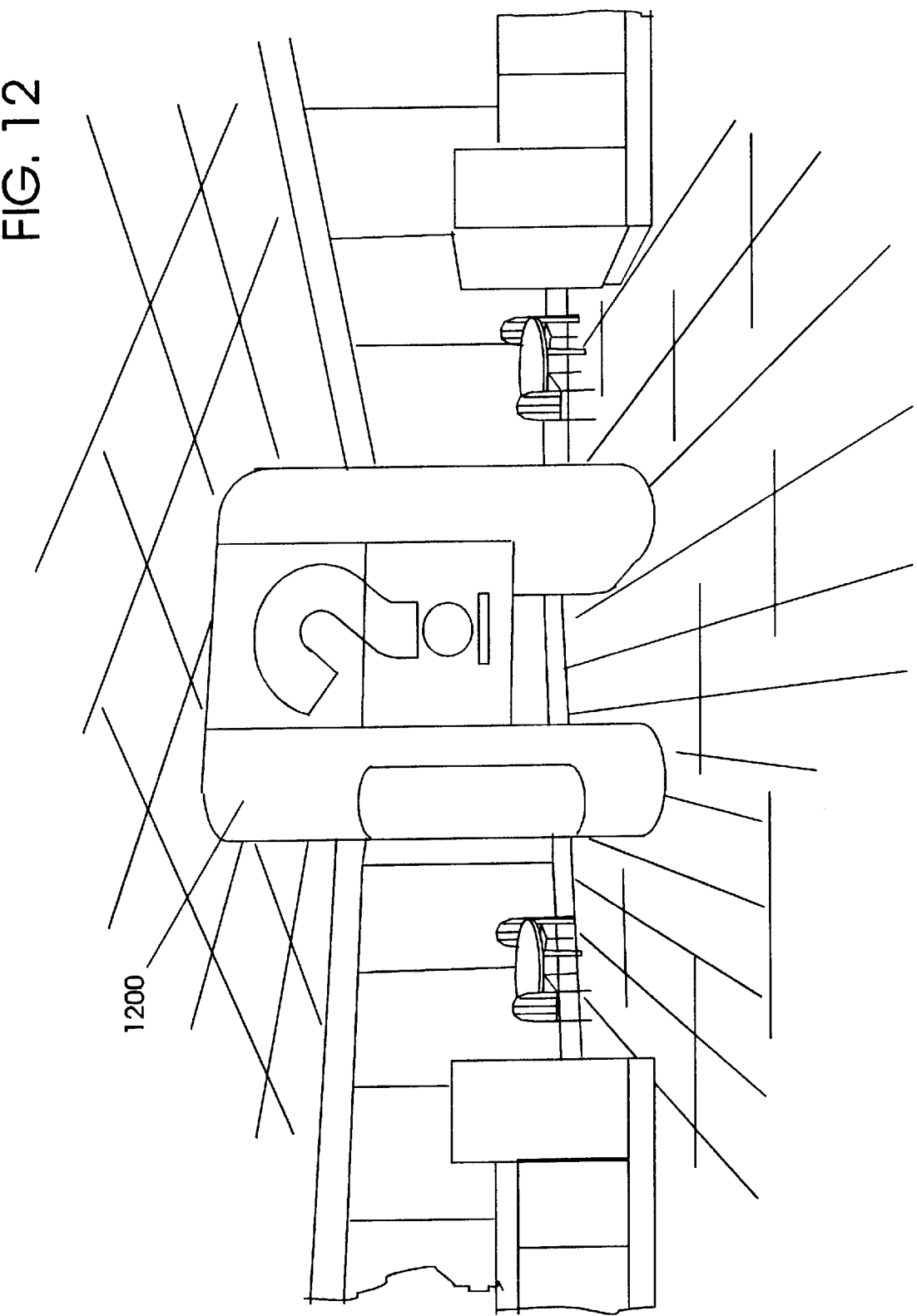
FIG. 12 illustrates a digital multimedia interactive kiosk according to the present invention.

Referring now to FIG. 11, the use of the present invention in a fast-food restaurant will now be described. As shown in FIG. 11, a fast-food restaurant includes a conventional fast-food restaurant counter 1100 including point-of-sale terminals and food and beverage dispensers. Above the counter 1100 is a menu board 1110. According to the present invention, the menu board comprises a digital multimedia menu board including a plurality of digital multimedia displays 1110a–1110d which are arranged in an array to form a virtual display. As is well known in the art, a "virtual display" is one in which two or more physical displays each display simultaneously a portion of an image or presentation which extends across all of the physical displays. FIG. 12 also shows a virtual display. The digital multimedia menu board 1110 may include digital multimedia presentations of menu items and prices and advertisements for items which are presently being sold at the restaurant site.

FIG. 11 illustrates one arrangement of a digital multimedia menu board 1110. However, it will be understood by those having skill in the art that many other arrangements may be provided. As shown in FIG. 11, display 1110a illustrates a multimedia advertisement for a particular promotional meal. Displays 1110b and 1110c illustrate value meal promotions. Display 1110d illustrates individual menu items and their associated prices.

By providing animated movement, a consumer may be induced to try a featured special. The menu board 1110 may change constantly. For example, the menu board may also include advertisements relating to participation of the restaurant in a local charity event for the next week.

Digital multimedia menu boards of the present invention may attract people to purchase selected items at a restaurant. Moreover, the concept-to-delivery cycle may be dramatically shortened. An idea may be created, a prototype generated, revisions made, approval obtained and the message delivered to the environment in a short turnaround time and without costly and time-consuming printing and physical distribution of media. Moreover, the content can be changed constantly and the customer can see a different message with each visit. Messaging can be targeted and refreshed at will. Moreover, testing of new menu boards can be done quickly and results can be evaluated and changes made rapidly to develop highly effective messaging.

Well designed moving images can attract the consumer and deliver message effectively. The use of space can be optimized and multi-part messages can be shown over a short period of time on the same display. Environments can respond to market conditions quickly. A restaurant can rapidly react with its own competitive offerings. Moreover, if a promotion is not effective, the creative agency can rapidly refine the messaging to be more effective.

Messaging can be targeted by the time of day and promotional cycle. Customers can see only the breakfast menu in the morning and only the lunch menu at lunch time. Customer decision-making can therefore be faster and clutter may be reduced. Rush hour messaging can be quick and immediate, while off-peak messages can target a different customer.

Moreover, by delivering content digitally from a central location, with promotion parameters such as start and end dates automatically managed, execution can be nearly flawless and nearly effortless for the on-site staff. Resources can be managed more efficiently, because managers no longer need to depend on employees to install and maintain signage throughout the restaurant. Staff mistakes can be reduced or eliminated, and stores do not need to use spare storage space for bulky promotional display materials.

FIG. 12 illustrates an interactive kiosk which may interface to the system of the present invention. The kiosk may be used to attract customers into the restaurant or to provide interactive game playing for a family as they enjoy a meal. Thus, the restaurant may become a center of family activities, rather than merely a location to eat.

Accordingly, the present invention provides systems, methods and computer program products which distribute and manage digital multimedia presentations which typically function in a environment as promotional, operational or edutainment applications. The invention allows presentations to be delivered to all sites or to particular sites selected by region or specific address. Presentations are executed on-site using computer systems capable of driving multiple digital displays to create a single virtual display of various sizes. These computer systems are referred to as "players". Since presentations are stored on the player, the site may be disconnected from the network without impacting operations other than presentation distribution. A particular presentation may be static, or may be modified by integration of site-specific data. Data integration may occur dynamically or one time only, and may be performed by an in-store computer system or by a central computer system. Presentations may be interactive, as in a touchscreen order-entry, wayfinding, or game program, or passive, as in a simple promotional display which the end-user just reads. Presentations typically run without requiring any in-store personnel action, but may include selection, scheduling, or configuration options which allow on-site personnel to customize the presentations.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for generating digital multimedia presentations for a plurality of remote locations, comprising the steps of:

assembling, at a central location, a package of digital multimedia presentations for the plurality of remote locations, the package including a default digital multimedia presentation which is free of a start time and an end time and at least one timed digital multimedia presentation to which is assigned a start time and an end time;

transmitting the package to the plurality of remote locations;

receiving the package at the remote locations;

storing the received timed and default digital multimedia presentations in a digital multimedia player at each remote location;

at each remote location, detecting that an assigned end time for an associated timed digital multimedia presentation has occurred, and no second timed digital multimedia presentation having a start time which corresponds to the assigned end time is available; and responsive to said step of detecting, automatically playing the stored default digital multimedia presentation on the digital multi-media display at the remote location.

2. A system for generating displays for a plurality of remote locations, comprising:

a central system including means for assembling a package of digital multimedia presentations for the remote locations, the package including a at least one timed digital multimedia presentation to which is assigned a start time and an end time, and a default digital multimedia presentation free of any start time or end time;

a network which transmits the package to the remote locations; and a digital multimedia system at each of the remote locations, the digital multimedia system comprising:

a storage device for storing the digital multimedia presentations in the received package;

a player for automatically playing, responsive to occurrence of an assigned start time, the associated stored timed multimedia presentation in the received package until the occurrence of the end time assigned to the timed multimedia presentation;

a detector of the player detecting that an assigned end time for an associated multimedia presentation has occurred, and that a second timed multimedia presentation with a start time which corresponds to the last said end time is not available; and the player automatically playing the stored default multimedia presentation in the received package responsive to the detector detecting that a second timed multimedia presentation with a start time which corresponds to the last said end time is not available.

3. A system for generating displays for a plurality of remote locations, comprising:

a central system including means for assembling a package of digital multimedia presentations for the remote locations, the package including a at least one timed digital multimedia presentation to which is assigned a start time and an end time, and a default digital multimedia presentation free of any start time or end time;

a network which transmits the package to the remote locations; and a digital multimedia system at each of the remote locations, the digital multimedia system comprising:

a storage device for storing the digital multimedia presentations in the received package;

a player for automatically playing, responsive to occurrence of an assigned start time, the associated stored timed multimedia presentation in the received package until the occurrence of the end time assigned to the timed multimedia presentation;

a detector of the player detecting that termination of a timed digital multimedia presentation has occurred prior to its assigned end time; and the player playing the stored default multimedia presentation in the received package responsive to the means for detecting detecting that timed digital multimedia presentation has terminated prior to its assigned end time.

4. A computer program product for generating displays for a plurality of remote locations, the computer program product including at least one computer-readable storage medium having computer-readable program code embodied in the medium, the computer-readable program code comprising:

first computer-readable program code for programming central processing means to assemble a package of digital multimedia presentations for the remote locations, the package including at least one timed digital multimedia presentation having associated therewith a start time and an end time, and a default digital multimedia presentation; and second computer-readable program code for programming remote processing means at a remote location, the programmed remote processing means automatically playing a timed and stored multimedia presentation received in the package at the remote location, the programmed remote processing means further playing the default multimedia presentation received by the remote location in the package upon detecting that an assigned end time for an associated digital multimedia presentation has occurred and that no other timed, stored digital multimedia presentation with a start time corresponding to the detected end time is available.

5. A computer program product for generating displays for a plurality of remote locations, the computer program product including at least one computer-readable storage medium having computer-readable program embodied in the medium, the computer-readable program code comprising:

first computer-readable program code for programming central processing means to assemble a package of digital multimedia presentations for the remote locations, the package including at least one timed digital multimedia presentation having associated therewith a start time and an end time, and a default digital multimedia presentation; and second computer-readable program code for programming remote processing means at a remote location, the programmed remote processing means automatically playing a timed and stored multimedia presentation received in the package at the remote location, the programmed remote processing means further playing the default multimedia presentation received by the remote location in the package upon detecting that the played, timed multimedia presentation has terminated prior to its associated end.

* * * * *